PATTERN RECOGNITION BY CONTOUR SEQUENCES

Filed Dec. 23, 1963 15 Sheets-Sheet 1

INVENTOR
WILLIAM S. ROHLAND
BY Donald F Voss
ATTORNEY

Sept. 20, 1966 W. S. ROHLAND 3,274,551

PATTERN RECOGNITION BY CONTOUR SEQUENCES

Filed Dec. 23, 1963 15 Sheets-Sheet 3

PATTERN RECOGNITION BY CONTOUR SEQUENCES

Filed Dec. 23, 1963

| | WHITE | 1 ST. DEGREE OF ENTRY INTO BLACK | | | | 2 ND. DEGREE OF ENTRY INTO BLACK | | 3 RD. DEGEE OF ENTRY INTO BLACK | BLACK | 1 ST. DEGREE OF EXIT FROM BLACK | | | | 2 ND. DEGREE OF EXIT FROM BLACK | | 3 RD. DEGREE OF EXIT FROM BLACK |
|---|---|---|---|---|---|---|---|---|---|---|---|---|---|---|---|---|
| CURRENT SCAN | 0 | X | X | X | X | X | X | X | X | 0 | 0 | 0 | 0 | 0 | 0 | 0 |
| 1 ST. PREVIOUS | 0 | 0 | 0 | 0 | 0 | X | X | X | X | X | X | X | X | 0 | 0 | 0 |
| 2 ND. PREVIOUS | 0 | 0 | X | X | 0 | 0 | 0 | X | X | X | 0 | 0 | X | X | X | 0 |
| 3 RD. PREVIOUS | 0 | 0 | 0 | X | X | 0 | X | 0 | X | X | X | 0 | 0 | X | 0 | X |
| OUTPUT | 0 | 1 | 1 | 1 | 1 | 3 | 3 | 5 | 7 | 2 | 2 | 2 | 2 | 4 | 4 | 6 |

PATTERN RECOGNITION BY CONTOUR SEQUENCES

1. $(1,3,5,7)_8,(2+4),(2+4+6+7)_4$ ⊣
2. $(4+6),4,2_3,7,(1+3)_3$ A
3. $(1+3+5)_5,1,[(1+3),(2+5+7)_5,(1+3)]_8$ 5
4. $7,(2+4+6)_4,7,(4+6+0)_5,7$ ∃
5. $7,(1+3)_4,(5+7),(1+3)_5,7$ E
6. $(1+3+5)_3,(0+7)_3,(1+3+5)_4$ !
7. $7,(2+4+6)_3,0_4,(2+4+6)_4,(5+7)$ 3
8. $[6,(4+2)+4,2],(3+5+7)_{10},[2,(4+6)+4,6]$ C
9. $(1+3),(3+5)_7\,(\overline{0+1}),3,1$ )
10. $(1+3+5),7,(4+6)_2,(4+6+0)_8,(4+6)_2,(5+7),(1+3+7)$ )
11. $7,(1+3)_{14},7$ [
12. $(3+5+7),(4+6+0)_2,(1+3)_3,(4+6+0)_3,(3+5+7)$ Ξ
13. $(3+5+7),(4+6+0)_2,(1+3)_3,(0)_{10}\,(\overline{3+5+7})$ =
14. $7,(1+3)_4,(5+7),(1+3)_5$ F
15. $7,(2+4+6)_2,0,7,(2+4+6)_4,7$ 3
16. $(2+4)_5,7,(2+4)_7$ ⊣
17. $(1+3)_5,(5+7),(1+3)_6$ ⊢
18. $(1+3)_{14}\cdot\overline{7}$ I
19. $(\overline{1+3+5})_2,(4+6)_{13},(5+7),(1+3+5+7)$ ⅃
20. $[1,(1+3+5)_3,7]^9$ L
21. $[(5+7),3,1]^8,0_2,[(1+3),3,(5+7)]^6$ (
22. $[(7)^3,]^4,\overline{7}$ -
23. $(1+3)_{13},7$ L
24. $(5+7),(2+4)_9$ ⅂
25. $[6,(4+2)+4,2],[5,(3+1)+3,1]$ /
26. $[1,(3+5)+3,5],[2,(4+6)+4,6]$ \
27. $(5+7),(1+3)_9$ Γ
28. $(2+4)_8,(5+7)$ ⅃
29. $7,0_{13},7$ ⊏
30. $(1+3+5),7,(2+4+6+0)_5^8,7,(1+3+5)$ ⊃
31. $(1+3),(5+7),(2+4+6)_9,(5+7),(3+1),7$ ⅂
32. $7,(2+4+6+0)_{10},(7+5_2),(2+4+6)$ ⅂
33. $7,(2+4+6+0)_5^8,7,2,4,6$ ʔ
34. $7,(2+4)_3,0,(1+3+5),7,(2+4+6)_4,7,(1+3+5)$ 3
35. $7,(2+4+6+0)_4,7,(2+4+6+0)_6,7$ Ξ
36. $7,(3+5)_3,7,(2+4+6),0,(1+3+5)_2,7$ S
37. $7,(1+3)_{13}$ Γ
38. $7,(4+6)_{14}$ ⅂
39. $(\overline{2+4+6})_2,(1+3+5)_{16},7,(2+4+6)$ L
40. $(2+4)_8,(1+3+5)_4$ /
41. $(3+5)_8,(2+4+6)_4$ \
42. $[6,(4+2)+4,2],(3+5+7),[2,(4+6)+4,6$ (
43. $[1,(3+5)+3,5],(2+4+6),[5,(3+1)+3,1]$ )
44. $[(5+7),4,6]^8,0_2,[6,4,(5+7)]^8$ )
45. $(6+4+2)_4,(5+3),1_4$ (
46. $(1+3+5)_4,2,4,6_4$ )
47. $7,0,6,4,2,5,3,1,7$ Z

FIG. 16

| | |
|---|---|
| A. | 1,2 |
| B. | 3,4,5 |
| C. | 6,7,8 |
| D. | 9,10,11 |
| E. | 12,5 |
| F. | 13,14 |
| G. | 6,15,8 |
| H. | 16,17 |
| I. | 18 |
| J. | 19,20 |
| K. | 21,17 |
| L. | 22,22,22,22,22,23 |
| M. | 24,25,26,27 |
| N. | 28,25,27 |
| O. | 9,10,29,8 |
| P. | 30,14 |
| Q. | 31,32,8 |
| R. | 33,14 |
| S. | 34,35,36 |
| T. | 37,38 |
| U. | 19,39 |
| V. | 40,25,26,41 |
| W. | 40,26,25,41 |
| X. | 21,42,43,44 |
| Y. | 45,46 |
| Z. | 47 |

FIG. 17

United States Patent Office 3,274,551 Patented Sept. 20, 1966

3,274,551
PATTERN RECOGNITION BY CONTOUR SEQUENCES

William S. Rohland, Rochester, Minn., assignor to International Business Machines Corporation, New York, N.Y., a corporation of New York Filed Dec. 23, 1963, Ser. No. 332,516
19 Claims. (Cl. 340—146.3)

This invention relates to pattern recognition apparatus and more particularly to pattern recognition apparatus where the data developed by scanning the pattern is utilized to develop a series of sequences defining contours which are then related in a manner to identify the pattern. The number of contour defining sequences used in combination to identify a pattern can be varied so as to permit a degree of variation in each kind of pattern and still positively identify the particular kind of pattern.

The invention is particularly adaptable to be utilized as character recognition apparatus for identifying numeric characters and upper and lower case alphabetic characters appearing in a wide variety of fonts or styles. Heretofore, many of the prior art character recognition devices were only capable of identifying characters represented by highly stylized fonts. The more versatile prior art character recognition devices do have the ability to identify uniformly represented characters in a non-stylized font. However, when attempting to identify characters represented by various fonts, or multi-fonts, the prior art recognition devices either involve an entirely different approach such as curve following or are quite limited in their recognition capabilities.

In the present invention, the pattern to be identified is scanned by a series of horizontally adjacent vertical scans. Scanning progresses from right to left across the pattern and each vertical scan consists of a series of horizontal segments corresponding to the sampling rate. Scanning within a vertical scan progresses from top to bottom.

If, during a vertical scan, a portion of the pattern is encountered at a particular sampling interval, then the horizontal segment corresponding to that sampling interval, will be considered as being black, depending upon the size of the portion encountered. Otherwise, if a portion of the pattern is not encountered or if the portion encountered is very small, then the horizontal segment for that particular sampling interval will be considered white.

The black and white conditions for each horizontal segment of a current vertical scan is examined with regard to the black and white conditions for the corresponding horizontal segments of any predetermined number of previous scans. In this manner, the degree to which scanning has progressed into or out of black for each horizontal segment of each vertical scan can be determined and identified by discrete symbols or notations.

The various degrees of entry into or exit from black are noted or indicated by a black-white depth detection circuit. The notations for the vertical scan are then examined by contour sequence circuits which provide an indication of segmental shapes of the pattern. The information of the segmental shapes defined by the contour sequence circuits is then furnished to logic circuits for identifying the kinds or classes of patterns. The number of variations accepted for each kind or class of pattern is determined by the degree to which the sequences are designed to permit general similarities in different styles of the same class of a pattern and to restrict similarities in different classes of patterns.

Accordingly, a principal object of this invention is to provide improved pattern recognition apparatus.

Another very important object of this invention is to provide pattern recognition apparatus which is capable of identifying different kinds or classes of patterns, where each kind or class of pattern is variously represented.

Still another very important object of the invention is to provide pattern recognition apparatus which scans a pattern with a series of horizontally adjacent vertical scans and at each of a series of horizontal segments within a vertical scan determines the degree to which scanning has progressed into or out of black and uses this information for developing contour sequences which are then examined for the purpose of identifying the patterns.

Another object of the invention is to provide pattern recognition apparatus which is capable of identifying numerical and upper and lower case alphabetic characters represented in various font styles.

The foregoing and other objects, features and advantages of the invention will be apparent from the following more particular description of a preferred embodiment of the invention, as illustrated in the accompanying drawings.

Figure 3:
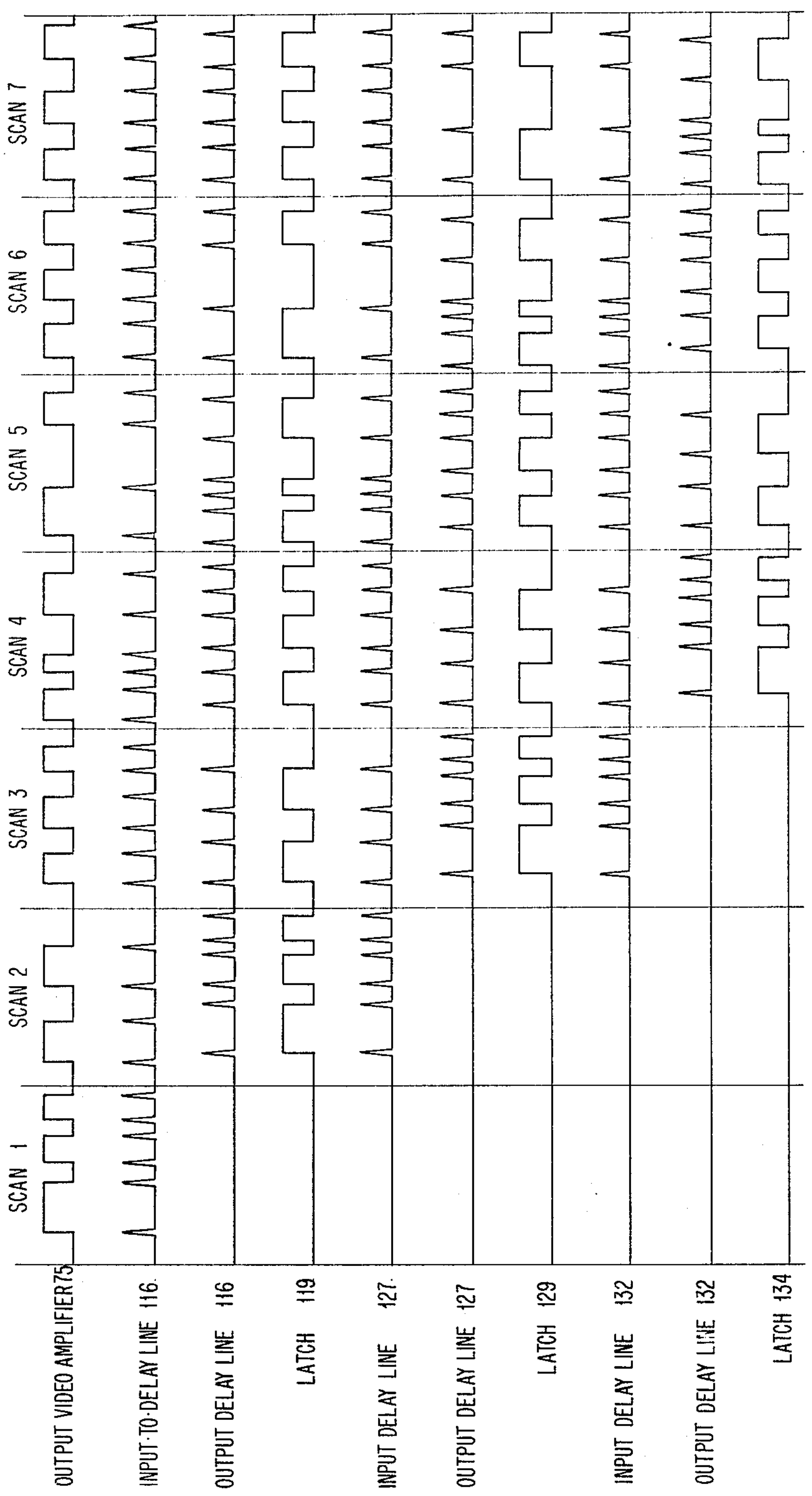
FIG. 3 is a wave form diagram of the video output signal and the reproduced video signal by the delay lines and latches.
Figure 6:
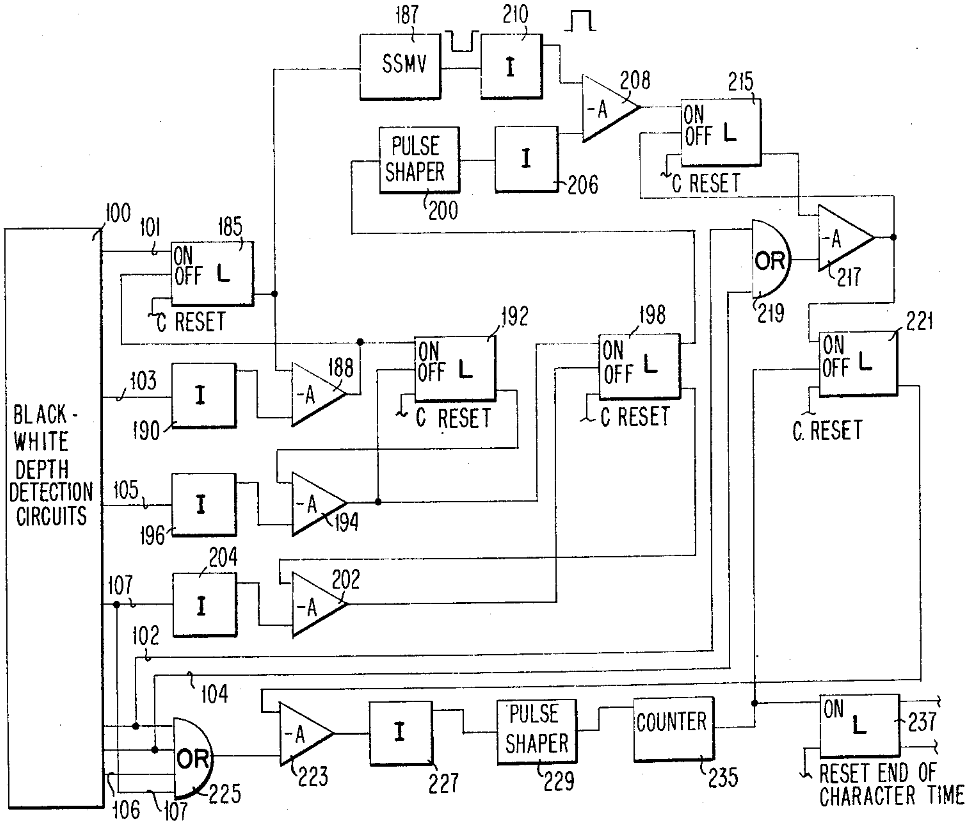
Figure 5A:
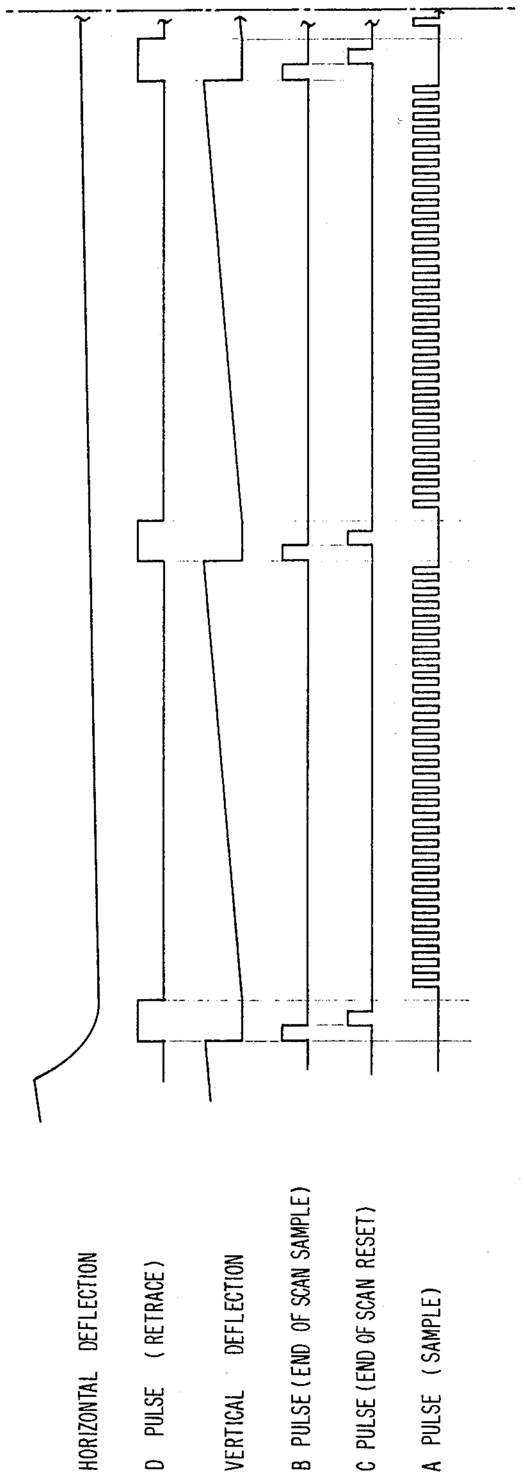
Figure 5B:
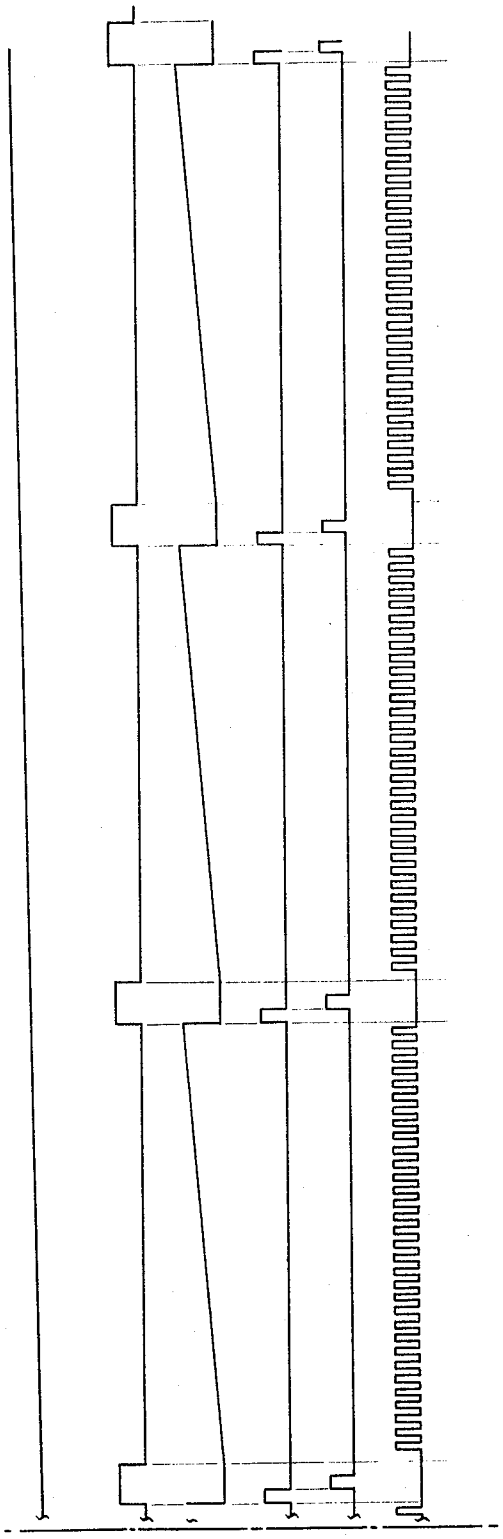
Figures 7, 8:
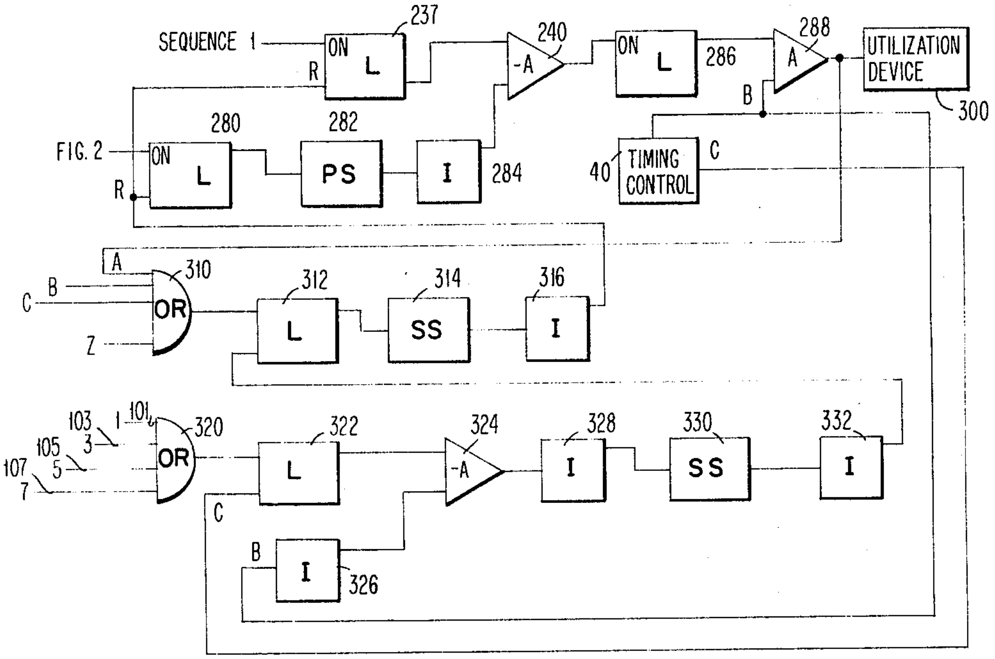
Figure 9:
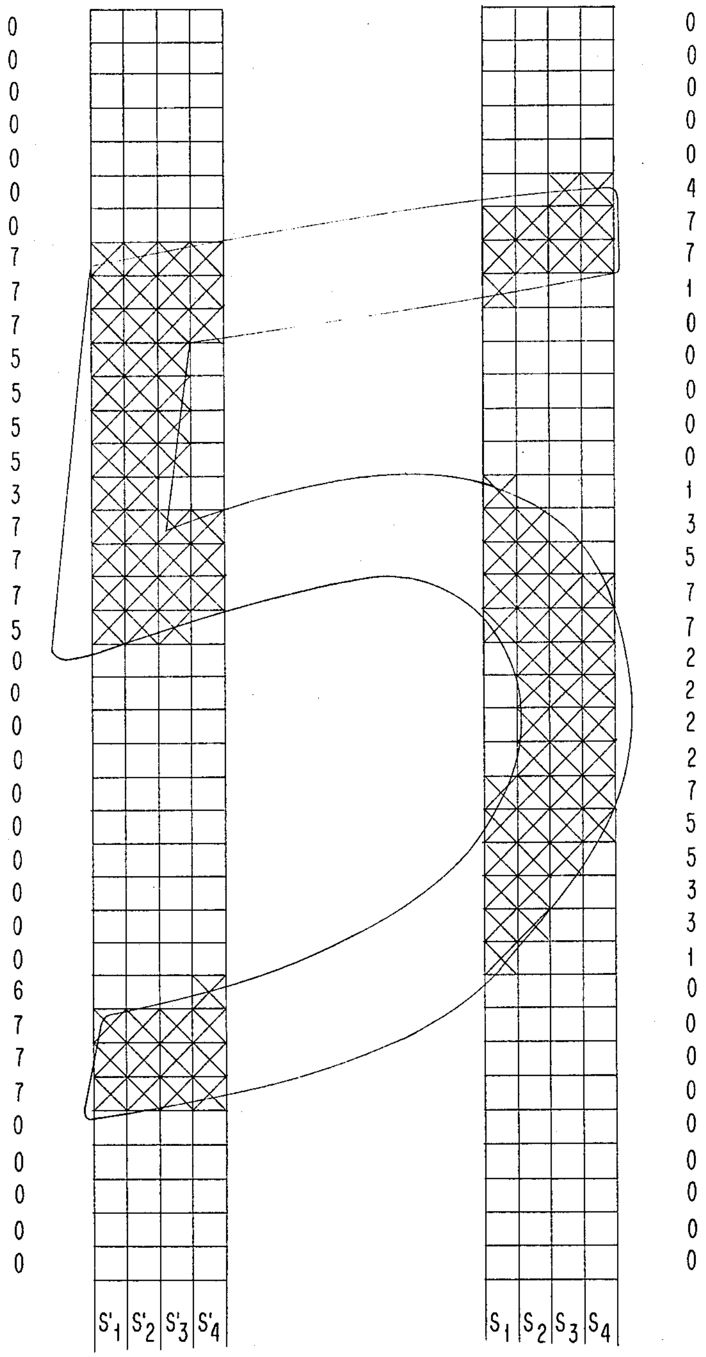
Figure 10:
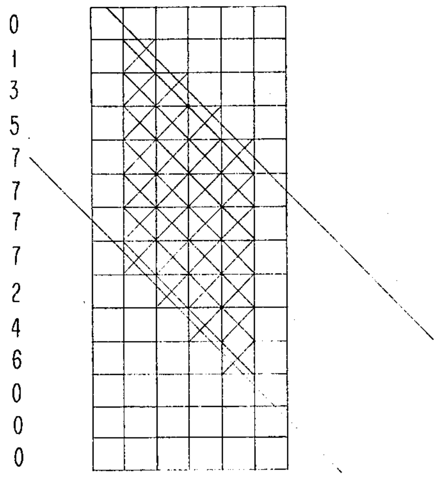
Figure 11:
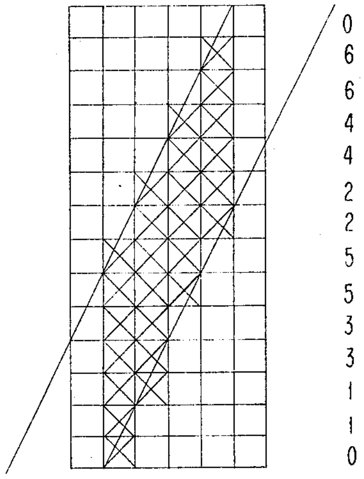
Figure 12A:
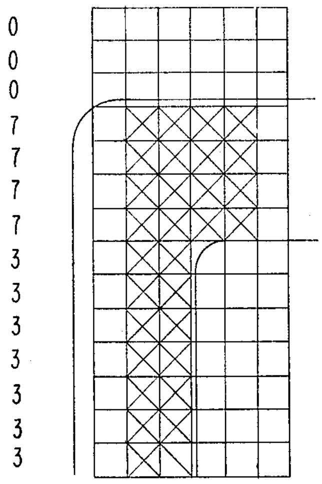
Figure 12B:
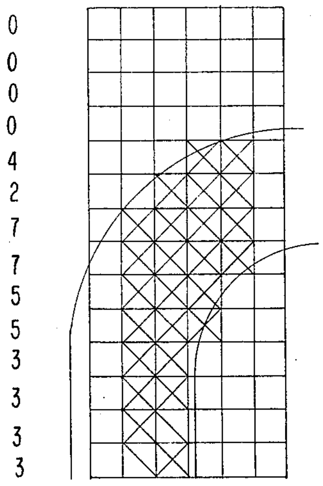
Figure 14:
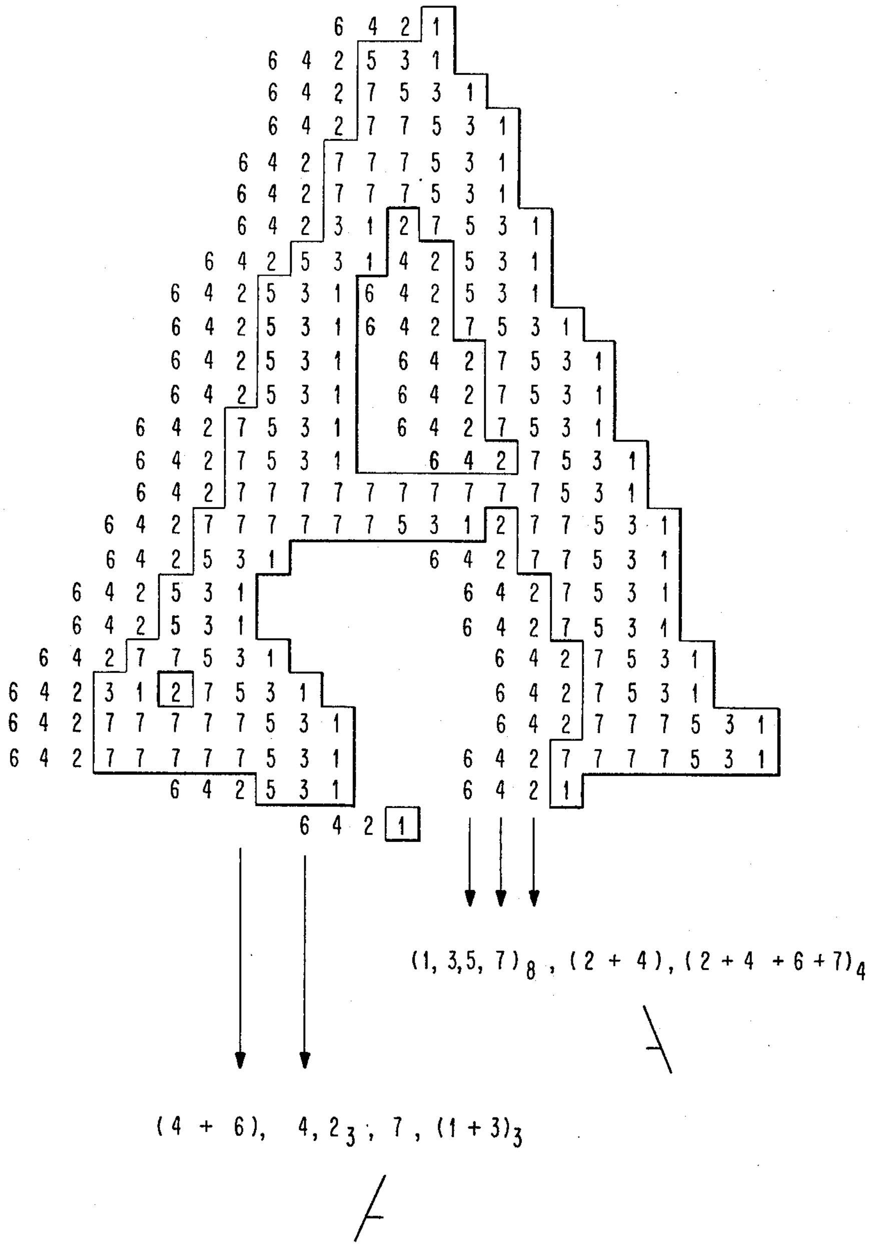
Figure 15:
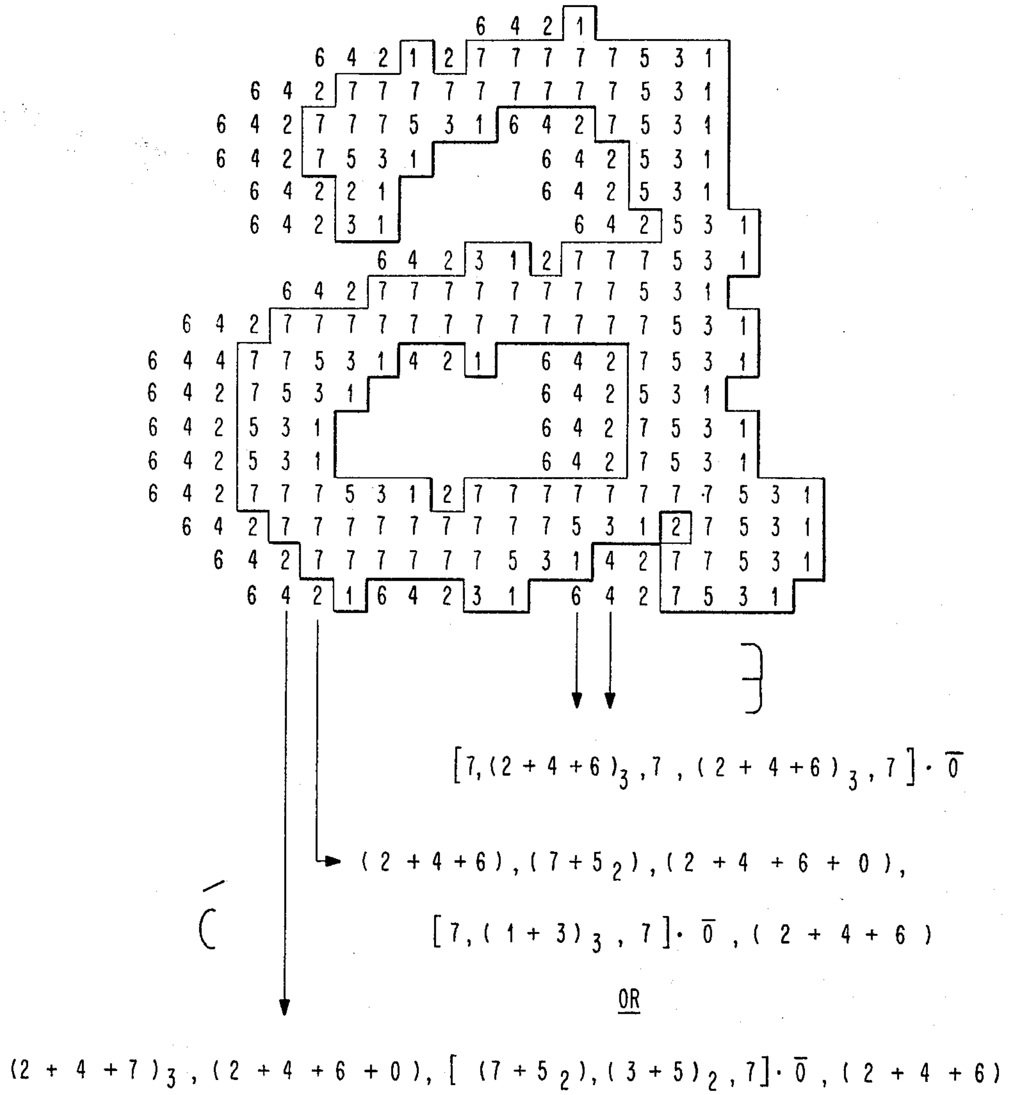

FIGS. 5*a* and 5*b* taken together with FIG. 5*b* disposed to the right of FIG. 5*a* represent a timing diagram showing the signals developed by the timing control circuit of FIG. 3;

FIG. 6 is a circuit diagram illustrative of the contour sequence circuits;

FIG. 7 is a circuit diagram illustrative of the recognition logic and the circuit for generating an end-of-character reset impulse;

FIG. 8 is a chart illustrating the various outputs available from the black-white depth detection circuits to indicate the condition of a horizontal segment as to whether it is considered to be in white, in black, a first, second or third degree of entry into black or a first, second or third degree of exit from black;

FIG. 9 is a diagram illustrating the numeric character 5 and two sets of four vertical scans with an X placed in the horizontal segments judged to be black and with the black-white depth detection circuit output notations for the current scans of the two sets of scans;

FIG. 10 is a diagram illustrating a segment of a pattern having a positive slope with the black-white depth detection circuit output notations also being shown;

FIG. 11 is a diagram illustrating a segment of a pattern having a negative slope with the black-white depth detection circuit output notations also being shown;

FIGS. 12*a* and 12*b* are diagrams illustrative of segments of a pattern having square and rounded corners respectively with the output notation of the black-white depth detection circuit shown for each condition;

FIGS. 13*a*, 13*b*, 13*c* and 13*d* are diagrams illustrative of the numeric character 3 represented in different fonts or styles with the output notation of the black-white depth detection circuit for each font or style shown;

FIG. 14 is a diagram illustrative of the black-white depth detection circuit outputs at each sample point throughout the scanning and showing which scans the sequences are satisfied to identify an upper case character A together with the outline of the character A as represented by the output of the video amplifier;

FIG. 15 is a diagram illustrative of the black-white depth detection circuit outputs at each sample point throughout the scanning and showing the scans at which the sequences are satisfied to identify a lower case character *a* together with the outline of the character *a* as represented by the output of the video amplifier;

FIG. 16 is a chart illustrating the scan sequencies and the segmental shapes represented thereby; and, FIG. 17 is a chart showing a typical character set with the scan sequencies for identifying the characters of the set.

Figure 1:
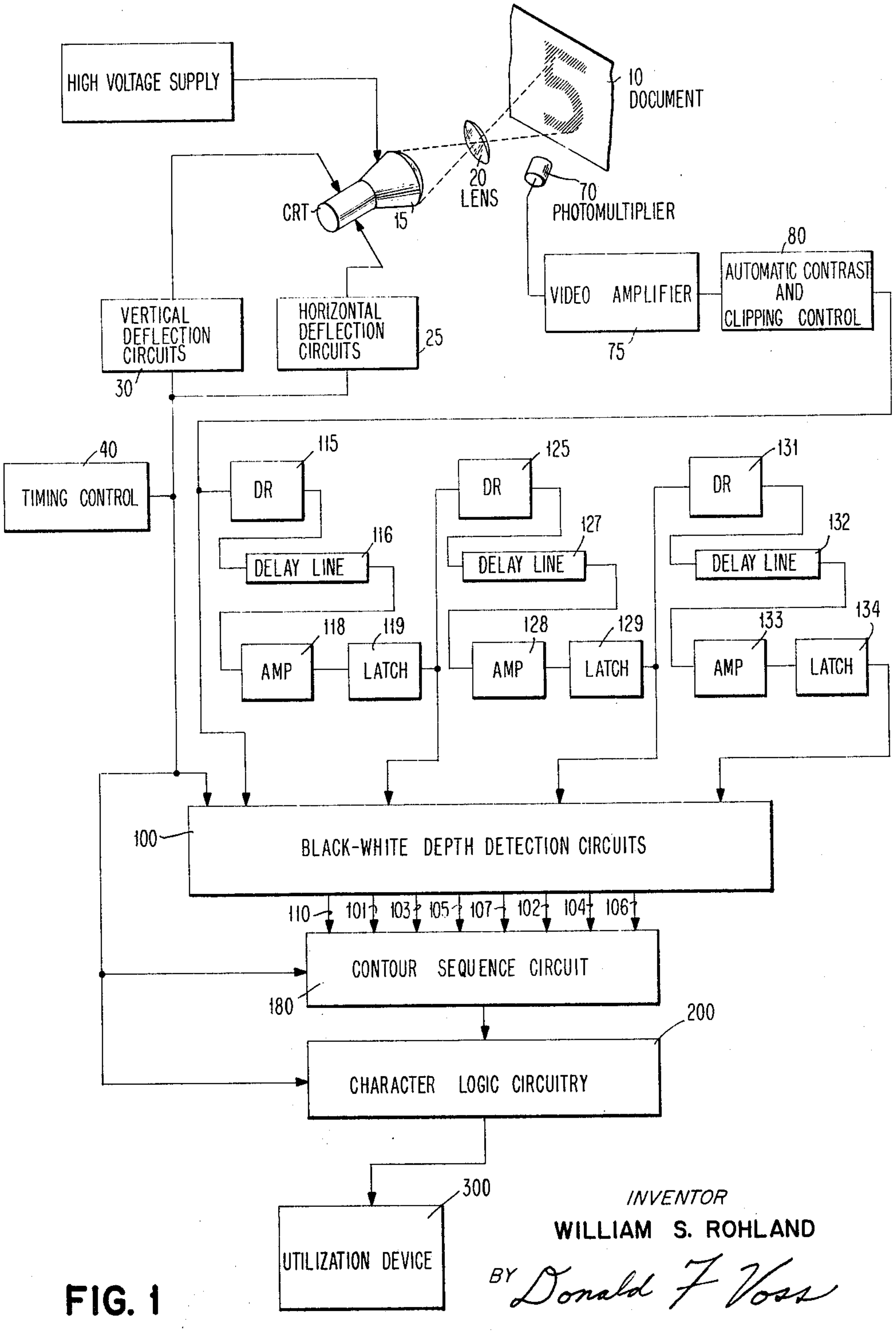
FIG. 1 is a schematic block diagram illustrating the invention.

With reference to the drawings, and particularly to FIG. 1, the invention is illustrated by way of example as including a conventional flying spot scanner for scanning a pattern contained on a record medium 10. In this example, the scanner consists of a cathode ray tube 15 which is illustrated schematically; however, it includes all the elements of a conventional cathode ray tube such as a cathode, grid and deflection plates.

The deflection system imparts vertical and horizontal components of motion to the electron beam of the cathode ray tube 15. The electron beam appears as a spot of light on the face of the cathode ray tube 15 as it strikes the phosphor screen thereof. The spot of light hereinafter referred to as the beam is focused by means of a lens 20 onto the record media or document 10. The invention is equally suitable to a deflection system of the electrostatic type or the magnetic type.

The basic scanning pattern is a simple vertical raster which could be accomplished as well with a mechanical image dissector. Movement of the beam during the scanning operation is under control of the horizontal deflection circuit 25 and the vertical deflection circuit 30. The horizontal and vertical deflection circuits 25 and 30 are conventional circuits which include high speed wave form generators. The deflection voltage produced by the horizontal deflection circuit is a linear voltage rising at a uniform rate as shown in FIGS. *5a* and *5b*. The vertical deflection voltage is a sawtooth type of voltage and is developed by charging a capacitor at a linear rate.

The horizontal and vertical deflection circuits 25 and 30 are under control of timing control 40. The timing control 40 includes circuitry for developing D impulses as shown in FIGS. *5a* and *5b* which discharges the capacitor for developing the vertical deflection voltage to zero to permit re-trace of the beam as it prepares for a subsequent vertical scan. It will be recalled that each scan has a finite width and the horizontal deflection is such that each vertical scan is displaced horizontally from the previous scan by the width of a scan so that adjacent scans abut each other but do not overlap.

Scanning progresses from the right side of the document 10 to the left side thereof. Scanning within a vertical scan takes place from top to bottom. Hence, it is seen that the horizontal deflection voltage developed by the horizontal deflection circuits 25 causes the beam of the cathode ray tube 15 to progress from right to left and the vertical deflection voltage developed by the vertical deflection circuit 30 causes the beam to scan from top to bottom, with the length of the vertical scan being controlled by the amplitude of the vertical sawtooth deflection wave form and the D impulse period, i.e., from leading edge of one D impulse to the leading edge of the next D impulse, of timing control 40. Timing control 40 also generates a B impulse, FIGS. *5a* and *5b*, which is indicative of the end of a vertical scan and its leading edge coincides with the leading edge of the D impulse. A C impulse is also generated by timing control 40 and it is indicative of end of scan reset. Its leading edge coincides with the trailing edge of the B impulse. The A impulses generated by timing control 40 are used as bit sample impulses and are generated during the time interval between D impulses.

Figure 4:
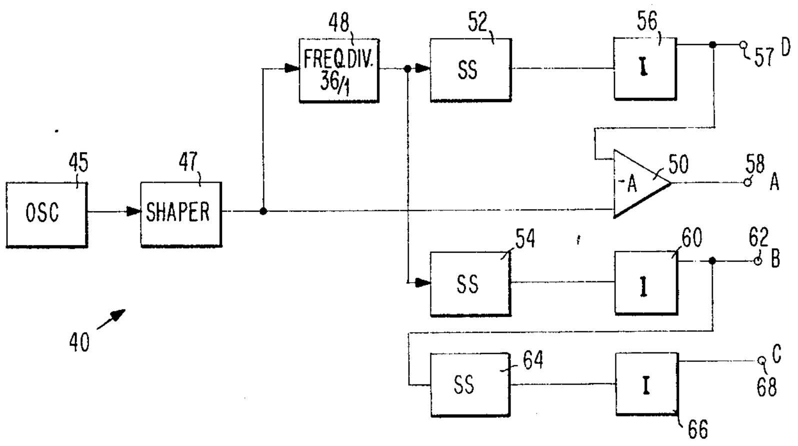
FIG. 4 is a schematic circuit diagram of the timing control circuit.

The timing control circuitry 40 is shown in FIG. 4 as including an oscillator 45 which has its output connected to a pulse shaper 47. The output of the pulse shaper is connected to an input of a 36 to 1 frequency divider 48 and to the input of a negative logical AND circuit 50. The 36 to 1 frequency divider 48 develops an output pulse for every 36 impulses applied to its input. As it will be seen shortly, the impulses from pulse shaper 47 are essentially A impulses which will be gated by the negative logical AND circuit 50. The negative logical AND circuits such as AND circuit 50 also perform an inversion.

The output of the frequency divider 48 is utilized to develop the B and D impulses. This is accomplished by means of two singleshot multivibrators having different periods. Hence, the output of frequency divider 48 is connected to the inputs of singleshot multivibrators 52 and 54 respectively. These singleshot multivibrators 52 and 54 are triggered by negative going impulses from frequency divider 48. The output of the singleshot multivibrator 52 is connected to the input of inverter 56 whose output is connected to a terminal 57 from which the D impulses are taken. The output of the inverter 56 is also connected to an input of the negative logical AND circuit 50, so that the logical AND circuit 50 will only pass A impulses to terminal 58, which is connected to the output thereof, when there are no D impulses at the output of inverter 56. During the time there are D impulses at the output of inverter 56, there will be no A impulses at the output terminal 58.

The output of the singleshot multivibrator 54 is connected to the input of the inverter 60 which has its output connected to a terminal 62 from which the B impulses will be taken. The output of the inverter 60 is also connected to the input of a singleshot multivibrator 64 wcihh functions to generate the C impulses. The output of the singleshot multivibrator 64 is connected to the input of an inverter 66 which has its output connected to a terminal 68. The C impulses will appear at terminal 68. As it will be seen shortly, the A impulses from the timing control 40 will be used for sampling and effectively divide each vertical scan into a series of horizontal segments or elemental areas.

A photomultiplier tube 70, FIG. 1, is positioned at an angle with respect to the document 10 and upon the same side of the document 10 as the cathode ray tube 15 so as to view the document 10 and detect the reflected light therefrom due to the beam impinging upon the document 10. It should be understood that the invention is equally suitable to a system where a photomultiplier tube or other light sensitive device is positioned on the opposite side of the document 10 so as to detect the light transmitted by the document 10, such as in the instance of a transparency.

The amount of light transmitted or reflected by the document 10 in the background area is different from the amount of light transmitted or reflected in the pattern area. Hence, the signal developed by the photomultiplier tube 70 when the beam is in the background area will be at one level and at another level when the beam is in the pattern area. Hereinafter, the background area will be referred to as a "white" area and the pattern area will be referred to as a "black" area. These terms are arbitrary and are not intended to limit the invention; however, they facilitate the explanation of the invention. Additionally, when the beam is in black, the output of the photomultiplier tube 70 is at an up level and when in white, the output is at a down level. These designations are also arbitrary and could be reversed without affecting the scope of the invention.

The output of the photomultiplier tube 70 is connected to the input of a video amplifier 75 which functions to amplify the signal developed by the photomultiplier tube 70. An automatic contrast and clipping level control circuitry 80 has its input connected to the output of the video amplifier 75 and functions to judge whether the beam is in white or black and to provide compensation for changes in background reflectance. The clipping level control circuitry of control circuitry 80 provides a dynamic clipping level as a function of the blackness of the pattern area and all signals from the video amplifier 75 below this level will be considered white and those above the level will be considered black. The function of the automatic contrast control of control circuit 80 is to provide dynamic compensation for changes in background reflectance. The output signal from the video amplifier 75 and automatic constrast and clipping level control circuitry 80 is digital in amplitude and analog in time, the signal being shown in FIG. 3.

The black and white conditions for each horizontal segment of a current vertical scan is examined with regard to the black and white conditions for the corresponding horizontal segments of a predetermined number of previous scans. In this manner, the degree to which scanning has progressed into or out of black for each horizontal segment of each vertical scan can be determined and identified by discrete symbols or notations. These notations for each vertical scan are examined to provide an indication of segmental shapes.

In this example, each horizontal segment of a current vertical scan is examined with regard to the black and white conditions for the corresponding horizontal segments of three previous scans. The otuput from the automatic contrast and clipping level control circuitry 80, FIG. 1, is indicative of current scan information and it is directly connected to the input of the black-white depth detection circuitry 100, and also is connected to the input of a delay line driver 115 which has its output connected to the input of a delay line 116. The length of the delay line 116 is equal to the duration of one vertical scan and is equal to the time interval between leading edges of D impulses.

The output of the delay line 116 is connected to the input of a sense amplifier 118 which has its output connected to the inputs of a latch 119. The delay line driver 115 enters a positive pulse into the delay line 116 at the leading edge of each signal developed by the beam when it is in black and enters another pulse into the delay line on the trailing edge of the signal which occurs when the beam leaves black. This is represented in FIG. 3. The delay line 116 has a series of pulses appearing at its output which are identical to the series of pulses entered from the driver 115; however, they occur exactly one scan after the input into the delay line.

The pulses from the delay line 116 switch the latch 119 from its one state to its other state so as to produce a signal identical to the signal from the automatic contrast and clipping control 80 exactly one scan later. The output of the latch 119 is connected to an input of the black-white depth detection circuit 100 and to the input of a delay line driver 125.

The delay line driver 125 functions in the same manner as the delay line driver 115 and has its output connected to the input of a delay line 127. The output of delay line 127 is connected to the input of an amplifier 128 which has its output connected to the inputs of a latch 129 in a manner similar to that described with respect to latch 119. The latch 129 has an output which is identical to the output of the automatic contrast and clipping level control circuit 80 except that the signal occurs exactly two scans later.

The output of latch 129 is connected to an input of the black-white depth detection circuit 100 and is also connected to the input of a delay line driver 131. The output of delay line driver 131 is connected to the input of a delay line 132 which has its output connected to the input of an amplifier 133. The output of amplifier 133 is connected to the inputs of a latch 134 which has its output connected to an input of the black-white depth detection circuit 100. The signal appearing at the output of latch 134 is identical to the signal appearing at the output of the automatic contrast and clipping level control circuit 80; however, it occurs exactly three scans later.

Figure 2:
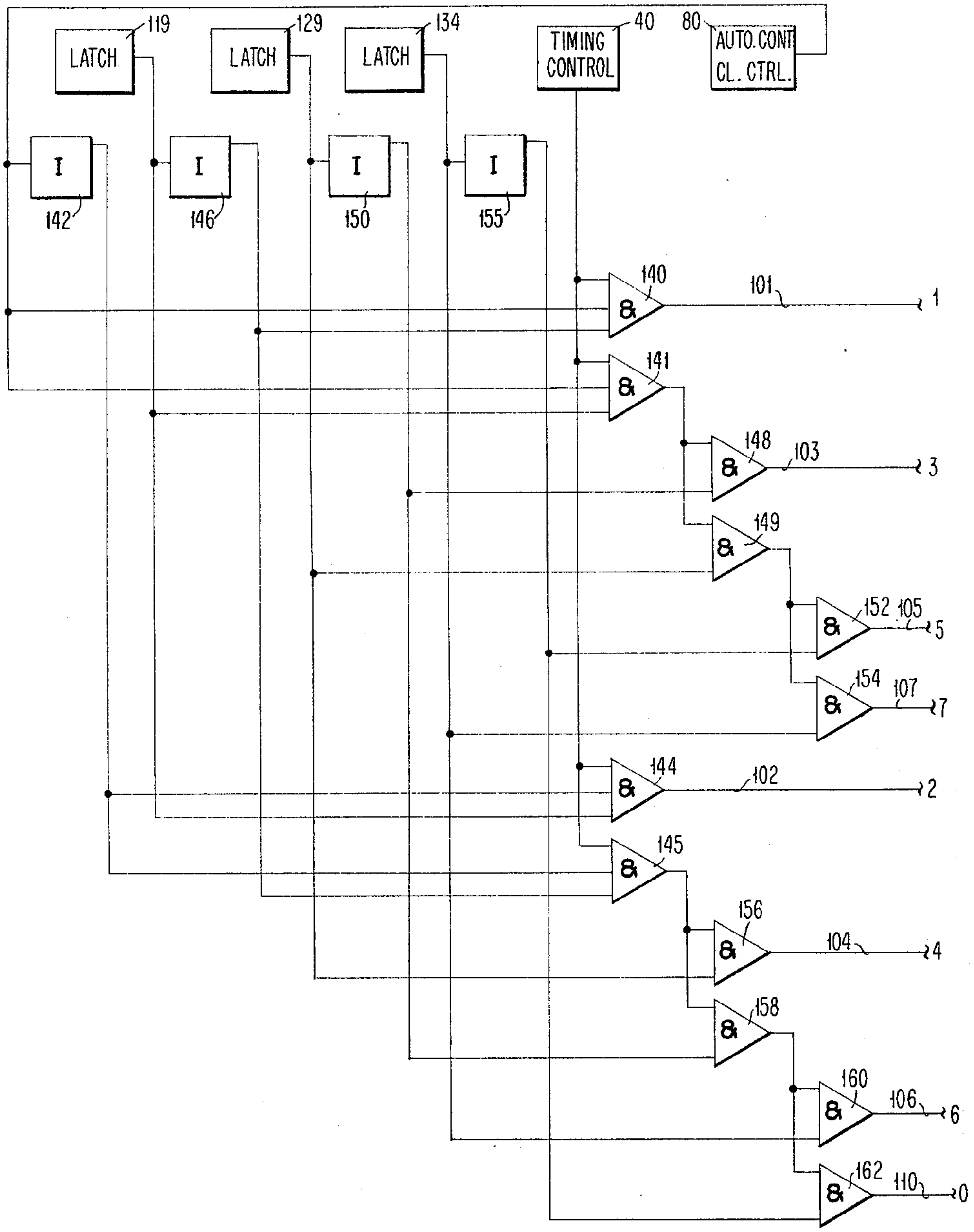
FIG. 2 is a schematic circuit diagram showing the black-white depth detection circuits.

The details of the black-white depth detection circuit 100 are shown in FIG. 2. The black-white depth detection circuit 100 can be considered as coding means for coding the horizontal segments within each vertical scan as to the degree of entry into or exit from black. The coded representations or notations for the various degrees of entry into and exit from black are shown in FIG. 8. The meaning of the coded notations will be described during the description of the black-white depth detection circuit 100. The input to the black-white depth detection circuit 100 from the automatic contrast and clipping level control circuit 80 is connected to inputs of logical AND circuits 140 and 141 and to the input of an inverter 142 which has its output connected to inputs of logical AND circuits 144 and 145. The input to the black-white depth detection circuit 100 from latch 119 is connected to inputs of logical AND circuits 141 and 144 and to the input of an inverter 146 which has its output connected to inputs of logical AND circuits 140 and 145. Logical AND circuits 140, 141, 144 and 145 each have an input connected to the timing control circuit 40 so as to receive an A impulse. Hence, it is seen that the A impulses function as sample pulses for conditioning the logical AND circuits 140, 141, 144 and 145.

The output of logical AND circuit 140 is connected to an input of the contour sequence circuits represented in FIG. 1 by block 180. When there is an output logical AND circuit 140, it is indicative that the beam is presently in black and during a previous scan at the same horizontal segment level the beam had been in white. This is considered to be the first degree of entry into black and in connection with this condition, no significance is given to the other two previous scans.

The output of logical AND circuit 141 is utilized to develop other outputs indicative of the degree of entry into black. Its output is connected to the input of a logical AND circuit 148 and to the input of a logical AND circuit 149. Logical AND circuit 148 also has an input from the output of an inverter 150 which has its input connected to the output of latch 129. The output of latch 129 is also connected to an input of logical AND circuit 149. The output of logical AND circuit 148 is connected to an input of the contour sequence circuits 180 and a signal appearing upon its output is indicative that the present scan and a first previous scan to the present scan were black for a particular horizontal segment after having experienced a white condition for the same horizontal segment level during the second previous scan to the present scan. Hence, a signal appearing at the output of logical AND circuit 148 is indicative of the second degree of entry into black.

The output of logical AND circuit 149 is connected to inputs of logical AND circuits 152 and 154. Logical AND circuit 152 also has an input connected to the output of an inverter 155. The output of logical AND circuit 152 is connected to an input of the contour sequence circuits 180. A signal appearing at the output of logical AND circuit 152 is indicative of a third degree of entry into black. A signal will appear at the output of logical AND circuit 152 when during any one sample time, the beam is in black on the current scan and has been in black during the first and second previous scans to the current scan after having been in white during the third previous scan.

Logical AND circuit 154 also has an input from the output of latch 134. The output of logical AND circuit 154 is connected to an input of the contour sequence circuits 180. A signal appearing at the output of logical AND circuit 154 is indicative that the beam has been in black for the current scan and the three previous scans with respect to corresponding horizontal segments for each of the scans.

The inputs to logical AND circuit 144 already have been described and its output is connected to an input of the contour sequence circuits 180. A signal will appear at the output of logical AND circuit 144 when the beam during a current scan is in white and had been in black during the first previous scan with respect to corresponding horizontal segments. A signal at the output of logical AND circuit 144 is indicative of a first degree of exit from black. The conditions for the corresponding horizontal segments for the second and third previous scans are immaterial in this instance.

The inputs to logical AND circuit 145 also have been previously described and its output is connected to inputs of logical AND circuits 156 and 158. Logical AND circuit 156 also has an input connected to the output of latch 129. The output of logical AND circuit 156 is connected to an input of the contour sequence circuits 180. A signal will appear on the output of logical AND circuit 156 when during a current scan the beam is in white for a particular horizontal segment of the current scan and the beam had been in white during the first previous scan for the corresponding horizontal segment after having been in black on the second previous scan for a corresponding horizontal segment. A signal appearing at the output of logical AND circuit 156 is indicative of a second degree of exit from black.

The output of logical AND circuit 158 is connected to inputs of logical AND circuits 160 and 162. Logical AND circuit 160 also has an input connected to the output of latch 134. The output of logical AND circuit 160 is connected to an input of the contour sequence circuits 180. A signal appears on the output of logical AND circuit 160 when the beam during a current scan for a particular sampling interval is in white and has been in white during corresponding sampling intervals in the first and second previous scans after having been in black on the third previous scan for a corresponding sampling interval. A signal appearing at the output of logical AND circuit 160 is indicative of a third degree of exit from black.

Logical AND circuit 162 also has an input from the output of inverter 155 which it will be recalled has its input connected to the output of latch 134. The output of logical AND circuit 162 is connected to an input of the contour sequence circuits 180. A signal will appear on the output of logical AND circuit 162 when during a current scan the beam is in white for a particular sampling period and the beam has been in white during three previous scans for the corresponding sampling periods. Notations 1, 3, 5, 7, 2, 4, 6 and 0 have been arbitrarily assigned to the outputs of logical AND circuits 140, 148, 152, 154, 144, 156, 160 and 162 respectively. The notation 1 accordingly is indicative that the beam is presently in black and during a previous scan at the same horizontal segment level it had been in white. This is considered to be a first degree of entry into black.

The notation 3 is indicative that the present scan and a first previous scan to the present scan were black for particular horizontal segment levels after having experienced a white condition at the same horizontal segment level during the second previous scan to the present scan. This is considered a second degree of entry into black.

The notation 5 is indicative of a third degree of entry into black. The third degree of entry into black signifies that the beam is in black on the current scan and has been in black during the first and second previous scans to the current scan after having been in white during the third previous scan.

The notation 7 is indicative that the beam has been in black for the current scan and three previous scans for corresponding horizontal segment levels.

The notation 2 is indicative of a first degree of exit from black. A first degree of exit from black signifies that the beam during a current scan is in white and had been in black during the first previous scan.

Notation 4 is indicative that during the current scan, the beam is in white for a particular horizontal segment of the current scan and the beam had been in white during the first previous scan for the corresponding horizontal segment after having been in black on the second previous scan for the same corresponding horizontal segment. This notation is indicative of a second degree of exit from black.

The notation 6 is indicative that the beam during the current scan for a particular sampling interval is in white and had been in white during first and second previous scans to the current scan after having been in black on the third previous scan. The notation 6 is therefore indicative of a third degree of exit from black.

The notation 0 is indicative that the beam is in white for a particular sampling period and had been in white during three previous scans for corresponding sampling periods. These notations are illustrated in FIG. 8.

With reference to FIG. 9, two sets of four vertical scans are shown with respect to the numerical character 5. The notations indicating the degree of entry into and exit from black for the current scans of the two sets of four scans are shown for the particular sampling intervals. An X is placed in the square representing a sampling interval which is judged to be black. The absence of an X in a sampling interval during any vertical scan is indicative that the automatic contrast and clipping level control circuits 80 judged the beam to be in white. It should be understood that the black-white depth detection circuits 100 provide a sequence of output notation signals for each vertical scan throughout the character; however, the black-white depth detection circuit output notations are only shown for the current scan of the two sets of four scans.

The sequence of outputs derived from the black-white depth detection circuit 100 during the current scan S1 of the first set of four scans describes a horizontal bar followed by a white area followed in turn by a large convex right curve or black area. The large convex right curve black area is followed by a white area with no following black areas. Hence, the sequence of notations from the black-white depth detection circuit 100 are indicative of segmental shapes. These segmental shapes just described could be the right-hand portion of the characters 5 or 6 when working with a set of numeric characters. The sequence of notations from the black-white depth detection circuit 100 during the current scan $$S_1^1$$

describes a horizontal bar having a left-hand portion connected to a downward extending vertical bar which in turn is connected at its lower end to another horizontal bar extending to the right. The horizontal bar extending to the right is followed by a white area followed by another horizontal bar extending to the right. Thus it is seen that the sequence of notations from the black-white depth detection circuit 100 during the current scan $$S_1^1$$

provides an indication of other segmental shapes of the pattern being scanned. It will be seen later herein that the sequence of notations for each scan throughout the character will provide indications of segmental shapes which permit identification of the pattern.

Before describing the contour sequence circuits 180, reference should be made to FIGS. 10 and 11 which are illustrative of how the output notations from the black-white depth detection circuit 100 can be used to identify the slope of a segment of a pattern having a positive slope. From examining the sequence of notations from the black-white depth detection circuit 100 in FIG. 10 it is seen that the notations for the degree of entry into black are increasing and the notations for the degree of exit from black are increasing. Hence, the series of notations increasing with respect to the degree of entry into black followed by a series of notations increasing with the degree of exit from black can be used to define a segment of a pattern having a positive slope. A segment of a pattern having a negative slope is shown in FIG. 11, and it is seen that the notations representative of the outputs from the black-white depth detection circuit 100 form a sequence with the notations indicating the degree of exit from black are decreasing and are followed by a series of notations indicating the degree of entry into black are decreasing. Hence, segments having negative slopes can be identified by a sequence of notations where the degree of exit from black is decreasing and is followed by a series of notations indicating the degree of entry into black which is decreasing. Additionally, the angle of the sloping segment can be determined by the number of successive identical notations for indicating the degree of entry into black or the degree of exit from black. Additionally, the series of notations indicating the degree of entry into black and the degree of exit from black will be separated from each other by notations indicating that the beam is in black depending upon the width of the segment. Hence, it is seen that for any given sloping segment, the number of notations indicating that the beam is in black which separate the notations indicating the degree of entry or exit from black is a measure of the segment width. This is readily apparent from observing the sloping segments in FIGS. 10 and 11, and the notations of the outputs from the black-white depth detection circuit 100.

Referring again to FIG. 9, it is seen that the convex right curve from the lower right-hand side of the character 5 can be generally defined by the sequence of notations indicating the degree of entry into black where the notations are first increasing and then decreasing. The presence and number of notations indicating black or a degree of exit from black between the two types of notations indicating the degree of entry into and exit from black for this sequence depends upon the width of the curved stroke and its mean radius.

The ability to properly identify characters in a variety of different fonts depends upon the ability to detect some differences between patterns of different classes and to detect the general similarities of styles of patterns of the same class. In many instances, this may be accomplished by having the ability to distinguish between square and round corners. With reference to FIGS. 12*a* and 12*b*, it is seen that the sequence of notations of the outputs of the black-white depth detection circuit 100 is different for a square corner than that for a round corner. The square corner provides a sequence of notations indicating that the beam is in black followed abruptly by a series of notations indicating the degree of entry into black. In the case of the round corner, the sequence comprises a series of notations indicating a degree of exit from black in a decreasing manner followed by a series of notations indicating the beam is in black which in turn is followed by a series of notations indicating a degree of entry into black in a decreasing manner.

Figure 13A:
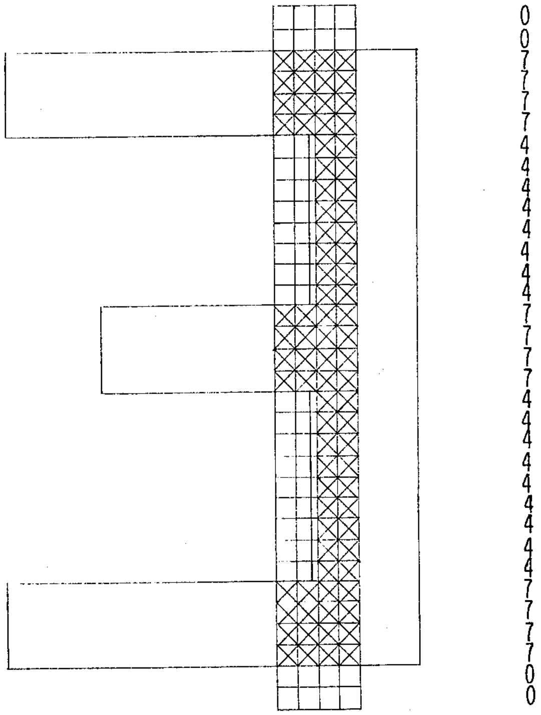

The ability of the invention to detect the general similarity in various styles of the same pattern is illustrated in FIGS. 13*a*, 13*b*, 13*c* and 13*d*. A set of four scans is shown with respect to the right side of each character illustrated in FIGS. 13*a*, 13*b*, 13*c* and 13*d*. In FIG. 13*a*, the sequence of notations for the present scan with respect to the series of scans shown indicates that a stylized numeric character three can be identified by a sequence having the notation for black occurring N number of times followed by a series of notations indicating a degree of exit from black occurring N number of times followed by a series of notations indicating black occurring N number of times followed by a series of notations indicating a degree of exit from black occurring N number of times followed by a series of notations indicating black occurring a predetermined number of times.

Figure 13B:
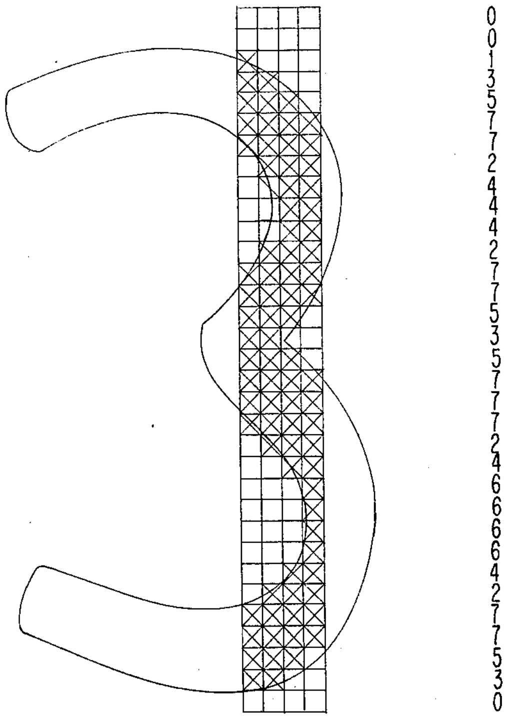
Figure 13C:
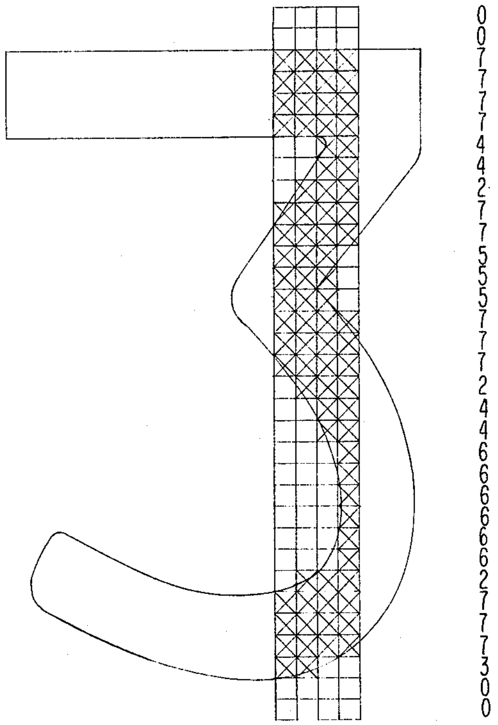
Figure 13D:
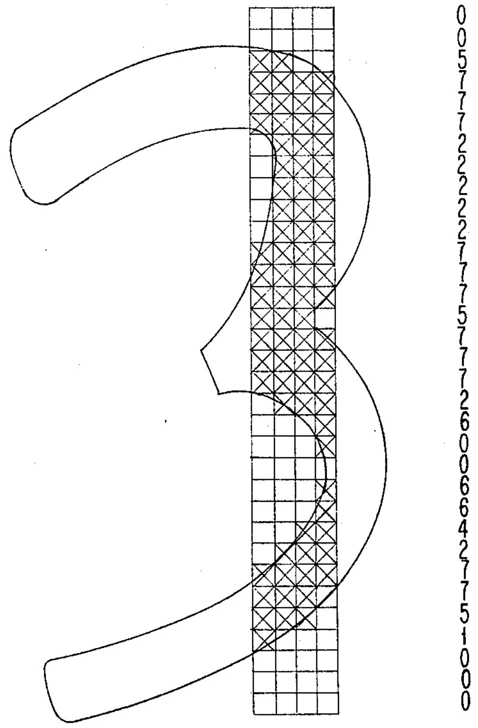

The non-stylized numeric character three shown in FIG. 13*c* provides a sequence of notations having a series of notations indicating black occurring N number of times followed by a series of notations indicating a decreasing degree of exit from black followed by a series of notations indicating black occurring N number of times followed by a series of notations indicating the same degree of entry into black occurring N number of times followed by a series of notations indicating black occurring N number of times followed by a series of increasing and then decreasing degrees of exit from black followed by a series of notations indicating black occurring N number of times.

The numeric character three illustrated in FIG. 13*b* has a sequence of notations including a series of notations indicating an increasing degree of entry into black followed by a series of notations indicating black occurring N number of times followed by a series of notations first indicating an increasing degree of exit from black. This is followed by notations indicating a decreasing degree of exit from black followed by a series of notations indicating black occurring N number of times followed by a series of notations indicating a decreasing degree of entry into black followed by an increasing degree of entry into black followed by a series of notations indicating black occurring N number of times followed by a series of notations indicating an increasing degree of exit from black followed by a decreasing degree of exit from black followed by a series of notations indicating black occurring N number of times followed by a series of notations indicating a decreasing degree of entry into black. Likewise the numeric character three shown in FIG. 13*d* can be described by a sequence having a series of notations indicating black occurring N number of times followed by a series of notations of the same degree of exit from black occurring N number of times followed by a series of notations indicating black occurring N number of times followed by a series of notations indicating an increasing degree of exit from black followed by notations indicating white occurring N number of times followed by notations indicating a decreasing degree of exit from black followed by notations indicating black occurring N number of times followed by notations indicating a decreasing entry into black.

The sequence of notations having a series of notations indicating black occuring N number of times followed by a series of notations indicating the same degree of exit from black occurring N number of times followed by a series of notations indicating black occurring N number of times followed by a series of notations indicating the same degree of exit from black occurring N number of times followed by a series of notations indicating black occurring N number of times will identify the right hand portion of each character shown in FIGS. 13*a*, 13*b*, 13*c* and 13*d*. However, if it were desired to write a sequence so as to exclude the right hand portion of the character in FIG. 13*a*, but identify the right hand portions of the character shown in FIGS. 13*b*, 13*c* and 13*d*, the sequence would be written with a series of notations indicating black occurring N number of times followed by a series of notations indicating the same degree of exit from black occurring N number of times followed by a series of notations indicating black occurring N number of times followed by a series of notations indicating an increasing degree of exit from black followed by a series of notations indicating a decreasing degree of exit from black followed by a series of notations indicating black occurring N number of times. It may be noted that the sequence could also be modified so as to identify the styles of numeric character three where the lower convex right curve extends considerably further to the right than the upper portion. Hence, this type of sequence would be more permissive in that it would include a wider range of styles for the character three. Additionally, in order to accomodate very fine line widths, the sequence could be further modified to identify the characters in FIGS. 13*a*, 13*b*, 13*c* and 13*d* by a sequence which includes a series of notations representing black or a degree of entry into black, either occurring N number of times, followed by a series of notations indicating a degree of exit from black occurring N number of times followed by a series of notations indicating black occurring N number of times followed by a series of notations of either a degree of exit from black or notations of white occurring N number of times followed by notations either indicating black or a degree of entry into black occurring N number of times.

With reference to FIG. 16, various scan sequences are shown together with the segmental shapes that they identify. In order to understand the notations for the scan sequences, a group of general definitions will be given. The quantity (1, 3, 5,) is a sequence of notations 1, 3 and 5 within a vertical scan with no restrictions as to the time in which they must occur and no restrictions with regard to any intervening notations. The quantity $(1, 3, 5)^8$ is a sequence of notations 1, 3 and 5 to be satisfied with the first notation of one to the first notation of five occurring in eight notations or less with no restrictions on intervening notations. Of course, the notation three must occur between notation one and five.

The quantity $$(1, 3, 5)_5^8$$

is a sequence of notations of 1, 3 and 5 to be satisfied with the first notation one and the first notation of five occurring in not less than five notations and not more than eight notations with no restrictions on the intervening notations. The quantity $$(1, 3_3, 5)_7^{11}$$

is a sequence of notations of 1, 3, 5 to be satisfied with the first notation one to the first notation five occurring in not less than seven notations and not more than eleven notations with a minimum of three notations for the notation three and with no restrictions with respect to intervening notations.

The quantity $$(1, 3, 5_4)_8^{12}$$

is a sequence of notations of 1, 3 and 5 to be satisfied with the first notation one to the last notation five occurring in not less than eight notations and not more than twelve notations with a minimum of four notations of five and no restrictions on intervening signals. In this instance, it will be noted that the last notation of five must occur in not less than eight notations and not more than twelve notations. This is somewhat different from the preceding because the previous quantity had a notation of three with a subscript three. Hence, the sequence had to be satisfied with the first notation of one to the first notation of five in not less than seven notations, and not more than eleven notations.

The quantity $$(1, 3, 5, 3, 1)_{12}^{16}(\bar{0})$$

is a sequence of notations of 1, 3, 5, 3 and 1 to be satisfied from the first notation one to the first notation of the subsequent one in not less than twelve notations but not more than sixteen notations with the restriction that a zero notation cannot occur anywhere in the sequence. The quantity $$(1, 3, 5_7^{10}. \bar{0}, 3, 1)_{12}^{16}$$

is a sequence of notations of 1, 3, 5, 3 and 1 to be satisfied with the first notation of one to the first notation of the subsequent one in not less than twelve notations and not more than sixteen notations with the restriction that a minimum of seven and a maximum of ten five notations must occur during which time a zero notation must not occur. The quantity $(1+3)_3$, $(5, 7)_8$ is a sequence of the notations one or three occurring at least three times followed by the notations five and seven in sequence with a minimum of eight bits between the first one or three and the first seven.

The definitions with respect to the sequence notations should make the notations listed in FIG. 16 readily understandable. The scan or contour sequences shown in FIG. 16 are detected or examined by the contour sequence circuits 180 of FIG. 1. In this example, there is a separate contour sequence circuit for each of the sequences shown in FIG. 16. The set of sequence circuits is adequate to permit recognition of the characters listed in FIG. 17. It also permits the characters listed in FIG. 17 to be represented in many styles or fonts. However, in order to identify patterns which are different from the characters of FIG. 17, not merely in style but different with respect to class, then the sequence circuits can either be changed to represent the new segmental shapes within the new set of patterns if any new segmental shapes exist or the sequence circuits can be combined differently to identify the new class of patterns if no new segmental shape exists.

In FIG. 6, a circuit is shown for implementing the contour sequence number 1 of FIG. 16. The implementation of the remaining contour sequence circuits will not be shown because the circuit implementing contour sequence number 1 provides sufficient teaching to one skilled in the art to enable implementation of the remaining sequence circuits. In FIG. 6, the output conductor 101 from the black-white depth detector circuit 100 represents the notation one and is connected to the set or on terminal of a latch 185. The off output of the latch 185 is connected to the input of a single-shot multivibrator 187 and to an input of a negative logical AND circuit 188. As it will be seen shortly, the negative logical AND circuit 188 functions to determine if a notation one is followed by a notation three.

The notation three appears on output conductor 103 which leads from the black-white depth detection circuit 100 to the input of an inverter 190 which has its output connected to an input of logical AND circuit 188. The output of logical AND circuit 188 is connected to the set or on terminal of the latch 192. The logical AND and OR circuits such as logical AND circuit 188 perform an inversion. The output of logical AND circuit 188 is also connected to the off terminal of latch 185. It is thus seen that when there is an output over conductor 101, latch 185 will be set and therefore its off output will be down so as to condition negative logical AND circuit 188. When there is a notation three over conductor 103, the signal representing the same will be up, however, it will be inverted by inverter 190 whereby the conditions of logical AND circuit 188 will be satisfied and there will be an output signal from logical AND circuit 188 to set or turn the latch 192 on and turn the latch 185 off.

The off output of the latch 192 is connected to an input of the negative logical AND circuit 194. The logical AND circuit 194 also has an input connected to the output of the inverter 196 which has its input connected to output conductor 105 which is adapted to transmit an impulse representing the notation five. Hence, when there has been a notation one, followed by a notation three, followed by a notation five, the input conditions to negative logical AND circuit 194 will be satisfied. The output of logical AND circuit 194 is connected to the off terminal of latch 192 and to the on terminal of a latch 198 which functions to indicate that there has been a sequence of notations 1, 3 and 5.

The set or on output of latch 198 is connected to the input of a pulse shaper 200 while the off output of latch 198 is connected to an input of a negative logical AND circuit 202. The pulse shaper 200 develops an impulse when the latch 198 is turned off. The latch 198 will be turned off when there is a notation 7. The output conductor 107 is connected to an input of an inverter 204 which has its output connected to an input of logical AND circuit 202. By this arrangement, when there has been a sequence of notations 1, 3, 5 followed by a notation 7, the latch 198 will be switched to its off stake whereby a pulse will be emitted from pulse shaper 200. The output of pulse shaper 200 is connected to the input of an inverter 206 which has its output connected to a negative AND circuit 208.

The negative AND circuit 208 also has an input connected to the output of an inverter 210. The input of inverter 210 is connected to the output of the singleshot multivibrator 187. The period of the singleshot multivibrator 187 is equal to approximately six and one-half times the period of the A impulses. By this arrangement, the negative logical AND circuit 208 is de-conditioned for a period of time equal to six sampling intervals following the sampling interval on which the singleshot multivibrator 187 is triggered. Thereafter, the logical AND circuit 208 will be conditioned to pass a signal at its output if there is a proper input from inverter 206. Therefore, AND circuit 208 will pass a signal at its output only if there is a signal at the output of inverter 206 on the eight or later interval of the sequence. There will be a proper signal from inverter 206 only if the notation 7 occurs in not less than eight sample times.

The output of logical AND circuit 208 is connected to the on terminal of the latch 215. The latch 215, once set, indicates that there has been a sequence of notations 1, 3, 5 and 7 with a minimum of 7 notations or sample times between the notation 1 and the first notation of notation 7. The off output of latch 215 is connected to an input of a negative logical AND circuit 217. Logical AND circuit 217 also has an input connected to the output of a logical OR circuit 219 which has one input connected to output conductor 102 and another input connected to output conductor 104. The output signal from logical OR circuit 219 is a negative going signal when either input is positive and hence when either a notation 2 or 4 occurs after the sequence $(1, 3, 5, 7)_8$ there will be an output from logical AND circuit 217. The output of logical AND circuit 217 is connected to the on input of the latch 221 and to the off input of latch 215. Hence, when latch 221 is set, it is indicative of the sequence $(1, 3, 5, 7)_8$, $(2+4)$.

The off output of latch 221 is connected to an input of a logical AND circuit 223. Logical AND circuit 223 also has an input connected to the output of a logical OR circuit 225. Logical OR circuit 225 has an input connected to output conductor 102, an input connected to output conductor 104, an input connected to output conductor 106 and an input connected to output conductor 107. Accordingly, with latch 221 set, logical AND circuit 223 will be conditioned to pass an output whenever there is a signal over either conductor 102, 104, 106, or 107. The output of logical AND circuit 223 is connected to the input of an inverter 227 which has its output connected to the input of a pulse shaper 229. The output of the pulse shaper 229 is connected to the input of the counter 235 which develops an output after it has received four pulses on its input. The output of the counter 235 is connected to the set terminal of a latch 237 and to the reset terminal of a latch 221. When latch 237 is set, it is indicative of the sequence $(1, 3, 5, 7)_8$, $(2+4)$, $(2+4+6+7)_4$.

During any one vertical scan, the logical circuitry for each sequence circuit will be operated. Additionally, the logic circuitry for each sequence circuit will have a latch similar to latch 237 for indicating, when set, that the particular sequence has been satisfied. At the end of a vertical scan which is indicated by a C pulse, the C pulse is transmitted overconductors connected to reset each latch of the sequence circuits, except the latches for indicating that a sequence has been satisfied, such as latch 237. The sequence indicating latches such as latch 237 are reset at the end of a character time as will be explained later herein.

The outputs from the contour sequence circuits 180 of FIG. 1, are connected to inputs of character logic circuitry 200. The character logic circuitry 200 examines the outputs of the contour sequence circuits for identifying the characters listed in the chart of FIG. 17. For example, to identify the character A, the first scan sequence of FIG. 16 must be satisfied, i.e., latch 237 must be set, and the second scan sequence must be satisfied before end of character time. When sequence 1 of FIG. 16 has been satisfied and is followed by the satisfaction of sequence 2, the character logic circuitry 200 will have an output identifying the character A. The output of the character logic circuitry 200 is connected to the input of some utilization device 300, FIG. 1. The utilization device 300 could be a computer, a printer or punch, or some other like device for processing data.

As previously mentioned, the other scan sequences shown in FIG. 16 are implemented in a manner similar to that of the circuit shown in FIG. 6 for implementing sequence No. 1. Having the benefit of the circuit shown in FIG. 6 and the notations for the remaining scan sequences listed in the chart in FIG. 16, a person skilled in the art is able to implement the circuitry for the remaining scan sequences. Similarly, only one recognition circuit will be shown of the character logic circuitry 200. The other recognition circuits would be implemented in a similar manner in accordance with the sequences listed in FIG. 17 for identifying the associated characters.

The recognition circuit for identifying the character A is shown in FIG. 7. Hence, with reference to FIG. 7, the off output of latch 237 is connected to an input of a negative AND circuit 240. A latch 280 when on is representative of the fact that the number 2 sequence shown in FIG. 16 has been satisfied. The on output of latch 280 is connected to a pulse shaper 282 which has its output connected to the input of an inverter 284. The output of the inverter 284 is connected to an input of the logical AND circuit 240. The output of logical AND circuit 240 is connected to the set terminal of the latch 286. By this arrangement, when latch 286 is set, it is indicative that sequence number 1 has been satisfied and thereafter, sequence number 2 has been satisfied. If sequence number 2 were satisfied prior to satisfaction of sequence number 1, the latch 286 would not be set because the pulse developed by pulse shaper 282 would not get through logical AND circuit 240 because logical AND circuit 240 would not be conditioned by the output of latch 237.

The on output of latch 286 is connected to an input of a positive AND circuit 288 which also has an input connected to receive B pulses from the timing control circuit 40. The output of the logical AND circuit 288 would be connected to utilization device 300.

The latches which indicate that a sequence has been satisfied, such as latches 237 and 280, are reset by an end-of-character pulse. In this particular example, the end-of-character pulse is developed by connecting all the conductors identifying the characters of a character set, i.e., A through Z, to inputs of a logical OR circuit 310, FIG. 7. The output of the logical OR circuit 310 is connected to the on terminal of a latch 312. This is indicative that the end-of-character pulse can occur anytime thereafter. Hence, when latch 312 is switched off, there will be a pulse over the conductor connecting the on output of latch 312 to the input of a singleshot multivibrator 314. The output of the singleshot multivibrator 314 is connected to the input of an inverter 316 on whose output will appear the end-of-character reset impulse.

The latch 312 is reset when there is a completely blank vertical scan after the character has been identified. A logical OR circuit 320 has inputs connected to the output conductors 101, 103, 105 and 107 which will carry an impulse when black is engaged in any vertical scan. The output of logical OR circuit 320 is connected to the on terminal of a latch 322. The set output of latch 322 is connected to an input of negative AND circuit 324. By this arrangement, the logical AND circuit 324 will be conditioned when the latch 322 is reset or switched off.

The off terminal of latch 322 is connected to the timing control 40 to receive a C pulse. The other input to logical AND circuit 324 is connected to the output of an inverter 326 which has its input connected to the timing control circuit 40 to receive a B pulse.

It is thus seen if black is not encountered during a vertical scan, the latch 322 will remain reset and logical AND circuit 324 will be conditioned to pass a pulse upon the occurrence of a B impulse. The output of logical AND circuit 324 is connected to the input of an inverter 328 which has its output connected to the input of a single-shot multivibrator 330. The output of the singleshot multivibrator 330 is connected to the input of an inverter 332 which has its output connected to the reset terminal of latch 312. It is thus seen that latch 312 will be reset by a pulse indicating that a character has been identified and a blank vertical scan occurred thereafter. The output of inverter 316 is connected to the reset terminals of all latches which function to indicate that a sequence has been satisfied, such as latches 237 and 280.

With reference to FIGS. 14 and 15, the notations from the black-white depth detection circuit 100 for each horizontal segment of a vertical scan except for the zero notations, are shown. It is seen that the scanning progresses from right to left, that when the character is engaged there will be a first degree of entry into black and the degrees of entry into black will increase and subsequently there will be a degree of exit from black when a white area is engaged. In view of the fact that the scanning beam is very small compared to the character being scanned, the outline of the character will be irregular. Further it is seen that the upper case A had a void within the lower left hand leg of the A. This void is represented by the notation 2.

From the foregoing it is seen that this invention develops data by scanning a pattern and the data so developed is utilized to further develop a series of sequences defining contours which are then related in a manner to identify the pattern. While the scanner is a high resolution scanner and hence an enormous amount of data is derived, only a relatively few scan sequences are required to identify the pattern scanned. Further, it is seen that the number of variations accepted for each kind or class of pattern is determined by the degree to which the sequences are designed to permit general similarities in different styles of the same class of pattern and to restrict similarities in different classes of patterns. By this arrangement, each class of patterns is capable of being identified although there are variations of the patterns within each class.

While the invention has been particularly shown and described with reference to a preferred embodiment thereof, it will be understood by those skilled in the art that various changes in form and details may be made therein without departing from the spirit and scope of the invention.

What is claimed is:

1. Pattern recognition apparatus in which patterns are scanned in a series of vertical scans horizontally displaced from each other, the pattern recognition apparatus including:

means for simultaneously presenting signals representing a present scan and a predetermined number of previous scans;

means for simultaneously sampling said signals a successive number of times;

depth detection means connected to said signal representing means and to said sampling means for developing weighted notation signals according to the optical condition of each sampling interval of each current scan and modified according to the optical conditions of horizontally adjacent previously scanned areas to indicate the degree of entry into and exit from the pattern for each sampling interval of each current scan;

examining means connected to said depth detection means for sequentially examining said notation signals within each vertical scan to develop outputs indicative of segmental shapes indicative of portions of patterns; and pattern identifying means operatively connected to said examining means to sequentially combine outputs therefrom for identifying the patterns.

2. Pattern recognition apparatus comprising:

scanning means for scanning a pattern in a series of vertical scans horizontally displaced from each other, said scanning means providing output signals digital in amplitude and analog in time;

timing control means for generating a series of sampling pulses for each vertical scan to divide the same into a series of segmental areas;

coding means connected to said scanning means and said timing control means for encoding each segmental area to provide weighted output signals according to the optical condition of each segmental area of each current scan and modified according to the optical conditions of horizontally adjacent previously scanned areas to indicate the degree of entry into and exit from black for each segmental area of each current scan;

sequence examining means connected to said coding means for sequentially examining said output signals from said coding means during each vertical scan to provide output signals indicative of segmental shapes; and pattern identifying means connected to said sequence examining means to sequentially combine output signals therefrom to provide an output signal identifying the pattern scanned.

3. Pattern recognition apparatus comprising:

scanning means for scanning a pattern in a series of vertical scans horizontally displaced from each other, said scanning means providing output signals digital in amplitude and analog in time;

timing control means for generating a series of sampling pulses for each vertical scan to divide the same into a series of segmental areas;

signal presenting means connected to said scanning means to receive the output signals therefrom to simultaneously present signals for a present scan and a predetermined number of previous scans;

logic means connected to said timing control means and said signal presenting means to provide a weighted output signal in coded form according to the optical condition of each segmental area of each current scan and modified according to the optical conditions of horizontally adjacent previously scanned areas to indicate the degree of entry into and exit from black for each segmental area of each current scan;

sequence examining means connected to said logic means and said timing control means for sequentially examining the coded signal for each segmental area in each vertical scan to provide output signals indicative of segmental shapes when the coded signals appear in predetermined sequences; and pattern identifying means connected to said sequence examining means and to said timing control means to sequentially combine output signals indicative of segmental shapes to provide an output signal identifying the pattern scanned.

4. The pattern recognition apparatus of claim 3 wherein said signal presenting means includes a plurality of delay means for simultaneously presenting signals of said predetermined number of previous scans.

5. The pattern recognition apparatus of claim 3 wherein said signal presenting means simultaneously presents signals for a present scan and three previous scans.

6. The pattern recognition apparatus of claim 3 wherein said logic means has coded outputs indicative of first, second and third degree of entry into black, black, first, second and third degree of exit from black, and white.

7. The pattern recognition apparatus of claim 3 wherein said sequence examining means includes a plurality of indicating means indicative of segmental shapes and settable according to predetermined sequences of outputs from said logic means within a scan.

8. The pattern recognition apparatus of claim 7 wherein said pattern identifying means sequentially examines said plurality of indicating means and provides an output signals indicative of the pattern scanned according to predetermined sequences of conditions of said plurality of indicating means.

9. Pattern recognition apparatus comprising:
scanning means for scanning a pattern in a series of vertical scans horizontally displaced from each other, said scanning means providing output signals digital in amplitude and analog in time;
timing control means for generating a series of sampling pulses for each vertical scan to divide the same into a series of segmental areas;
a plurality of delay means serially connected to each other with the first delay means being connected to said scanning means, said delay means simultaneously presenting signals for a predetermined number of previous scans;
logic means connected to said scanning means, said timing control means and said plurality of delay means to provide a weighted output signal in coded form according to the optical condition of each segmental area of each current scan and modified according to the optical conditions of horizontally adjacent previously scanned areas to indicate the degree of entry into and exit from black for each segmental area of each current scan;
sequence examining means connected to said logic means and said timing control means for sequentially examining the coded signal for each segmental area in each vertical scan and provide output signals indicative of segmental shapes when the coded signals appear in predetermined sequences; and
pattern identifying means connected to said sequence examining means and to said timing control means to sequentially combine said signals indicative of segmental shapes and thereby provide an output signal identifying the pattern scanned.

10. The pattern recognition apparatus of claim 9 wherein said sequence examining means includes a plurality of indicating means indicative of segmental shapes and settable according to predetermined sequences of outputs from said logic means within a vertical scan.

11. Pattern recognition apparatus comprising:
scanning means for scanning a pattern in a series of vertical scans horizontally displaced from each other, said scanning means providing output signals digital in amplitude and analog in time;
timing control means for generating a series of sampling pulses for each vertical scan to divide the same into a series of segmental areas;
coding means connected to said scanning means and said timing control means for encoding each segmental area to provide weighted output signals according to the optical condition of each segmental area of each current scan and modified according to the optical conditions of horizontally adjacent previously scanned areas to indicate the degree of entry into and exit from black for each segmental area of each current scan;
sequence examining means connected to said coding means for sequentially examining said output signals from said coding means during each vertical scan to provide output signals indicative of segmental shapes; and
pattern identifying means connected to said sequence examining means to combine output signals therefrom to provide an output signal identifying the pattern scanned.

12. Pattern recognition apparatus comprising:
scanning means for scanning a pattern in a series of vertical scans horizontally displaced from each other, said scanning means providing output signals digital in amplitude and analog in time;
means connected to said scanning means for simultaneously presenting signals representing a present scan and a predetermined number of previous scans;
means for simultaneously sampling said signals from said signal representing means a successive number of times;
depth detection means connected to said signal representing means and to said sampling means for developing weighted signals according to the optical condition of each sampling interval of each current scan and modified according to the optical conditions of horizontally adjacent previously scanned areas to indicate the degree of entry into and exit from the pattern for each sampling interval of each current scan;
examining means connected to said depth detection means for sequentially examining said notations within each vertical scan to develop outputs indicative of segmental shapes indicative of portions of patterns; and
pattern identifying means operatively connected to said examining means to instantaneously combine outputs therefrom for identifying the pattern.

13. The pattern recognition apparatus of claim 12 wherein said examining means includes storage means for storing said outputs indicative of segmental shapes.

14. The pattern recognition apparatus of claim 9 wherein said delay means simultaneously presents signals for three previous scans.

15. The pattern recognition apparatus of claim 9 wherein said sequence examining means includes means for storing said output signals indicative of segmental shapes when the coded signals appear in predetermined sequences.

16. The pattern recognition apparatus of claim 15 wherein said storage means comprise latches.

17. Pattern recognition apparatus comprising:
scanning means for scanning a pattern in a series of vertical scans horizontally displaced from each other, said scanning means providing output signals digital in amplitude and analog in time;
timing control means for generating a series of sampling pulses for each vertical scan to divide the same into a series of segmental areas;
coding means connected to said scanning means and said timing control means for encoding each segmental area within a vertical scan into a weighted number according to the optical condition of said segmental area and modified according to the optical conditions of horizontally adjacent previously scanned segmental areas to indicate the degree of entry and exit into black and white optical conditions for each segmental area of each current scan, there being a discrete output signal for each number;
sequence examining means connected to said coding means to receive said discrete output signals sequentially within a vertical scan for each vertical scan and provide output signals indicative of segmental shapes; and
pattern identifying means connected to said sequence examining means to sequentially combine output signals therefrom to provide an output signal identifying the pattern scanned.

18. In pattern recognition apparatus where scanning means scan a pattern in a series of vertical scans horizontally displaced from each other to provide output signals representative of the pattern scanned with timing control means for generating a series of sampling pulses for each vertical scan to divide the same into a series of segmental areas and with signal presenting means connected to the scanning means to receive the output signals therefrom to simultaneously present signals for a present scan and a predetermined number of previous scans, the improvement comprising:

coding means connected to said timing control means and said signal presenting means to provide weighted output signals for each segmental area representative of the optical condition thereof and modified according to the optical conditions of horizontally adjacent previously scanned areas to indicate the degree of entry and exit into black and white optical conditions for each segmental area of each current scan;

sequence examining means connected to said coding means and operative to sequentially examine said weighted signal for each segmental area in each vertical scan and provide output signals indicative of segmental shapes; and pattern identifying means connected to said sequence examining means to sequentially combine output signals indicative of segmental shapes and provide an output signal identifying the pattern scanned.

19. In pattern recognition apparatus where scanning means scan a pattern in a series of vertical scans horizontally displaced from each other to provide output signals representative of the pattern scanned with timing control means for generating a series of sampling pulses for each vertical scan to divide the same into a series of segmental areas and with signal presenting means connected to the scanning means to receive the output signals therefrom to simultaneously present signals for a present scan and a predetermined number of previous scans, the improvement comprising:

coding means connected to said timing control means and said signal presenting means to provide weighted output signals for each segmental area representative of the optical condition thereof and modified according to the optical conditions of horizontally adjacent previously scanned areas to indicate the degree of entry and exit into black and white optical conditions for each segmental area of each current scan;

sequence examining means connected to said coding means and operative to sequentially examine the weighted signal for each segmental area in each vertical scan and provide output signals indicative of segmental shapes; and pattern identifying means operatively connected to said sequence examining means to instantaneously combine outputs therefrom for identifying the pattern.

References Cited by the Examiner

UNITED STATES PATENTS

| | | | |
|---|---|---|---|
| 3,178,687 | 4/1965 | Perotto | 340—146.3 |
| 3,178,688 | 4/1965 | Hill | 340—146.3 |

References Cited by the Applicant

UNITED STATES PATENTS

| | | |
|---|---|---|
| 2,766,444 | 10/1956 | Sheftelman. |
| 2,787,416 | 4/1957 | Hansen. |
| 2,877,951 | 3/1959 | Rohland. |
| 2,889,535 | 6/1959 | Rochester. |
| 2,927,303 | 3/1960 | Elbinger. |
| 2,932,006 | 4/1960 | Glauberman. |
| 2,959,769 | 11/1960 | Greanias. |
| 3,000,000 | 9/1961 | Eldredge. |
| 3,011,152 | 11/1961 | Eckdahl. |

MAYNARD R. WILBUR, *Primary Examiner.*

MALCOLM A. MORRISON, DARYL W. COOK, *Examiners.*

J. E. SMITH, *Assistant Examiner.*